United States Patent [19]
Block

[11] 3,866,402
[45] Feb. 18, 1975

[54] SIDE DELIVERY RAKE SUPPORT
[75] Inventor: Donald P. Block, Orlando, Fla.
[73] Assignee: FMC Corporation, San Jose, Calif.
[22] Filed: July 11, 1973
[21] Appl. No.: 378,087

Related U.S. Application Data
[62] Division of Ser. No. 248,221, April 27, 1972, Pat. No. 3,762,140.

[52] U.S. Cl............... 56/377, 56/10.2, 56/11.9, 56/328 R
[51] Int. Cl............................................ A01d 77/06
[58] Field of Search ............ 56/377, 375, 376, 370, 56/372, 365, 366, 367, 10.2, 11.9, 328

[56] References Cited
UNITED STATES PATENTS
| | | | |
|---|---|---|---|
| 1,291,392 | 1/1919 | Burgess | 56/14.7 X |
| 2,436,475 | 2/1948 | Jones et al. | 56/377 |
| 2,929,187 | 3/1960 | Boggio | 56/11.9 |

Primary Examiner—Russell R. Kinsey
Attorney, Agent, or Firm—C. E. Tripp; A. J. Moore

[57] ABSTRACT

A support for a side delivery rake for accurately controlling the raking height of the rake tines relative to the uneven ground surface supporting articles to be windrowed. The rake support includes a boom pivotally connected to the rake and at least one caster wheel. The pivotal mounting may include a pair of spaced parallelogram linkages, or may include a single pivoted mounting mechanism disposed near the longitudinal midpoint of the rake and providing pivotal movement about a pair of generally horizontal axes disposed at 90° to each other.

6 Claims, 18 Drawing Figures

SLIDE RAKE

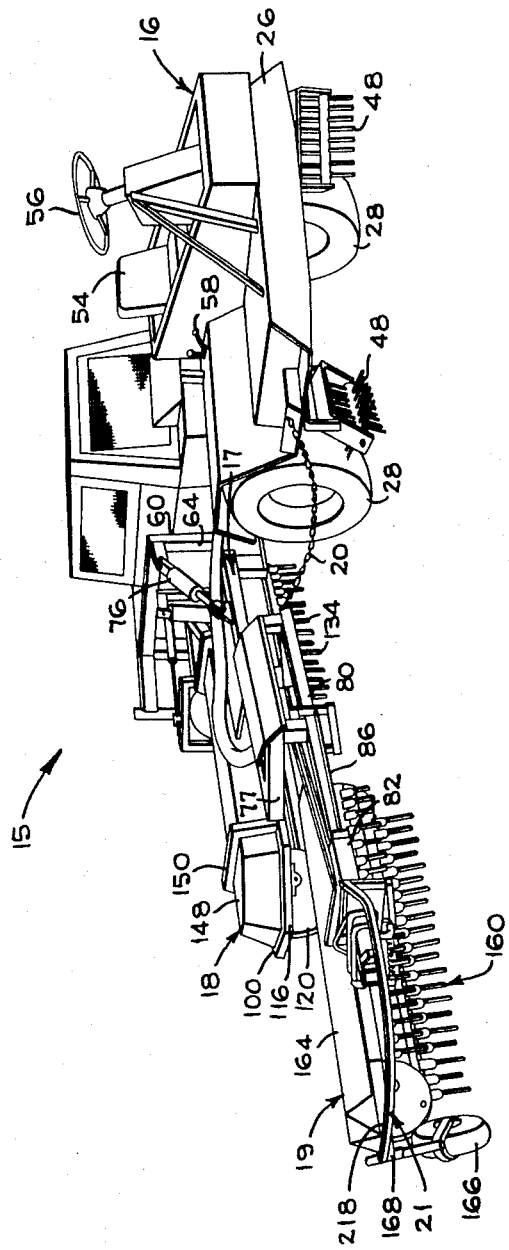
FIG_1

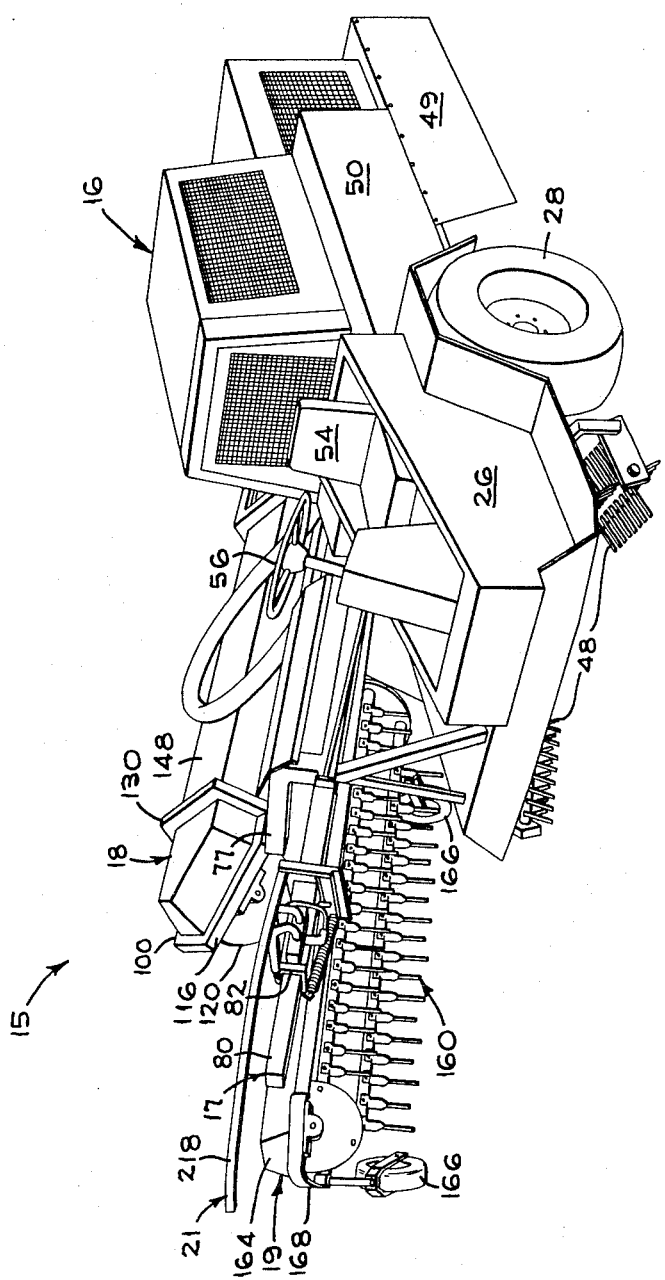

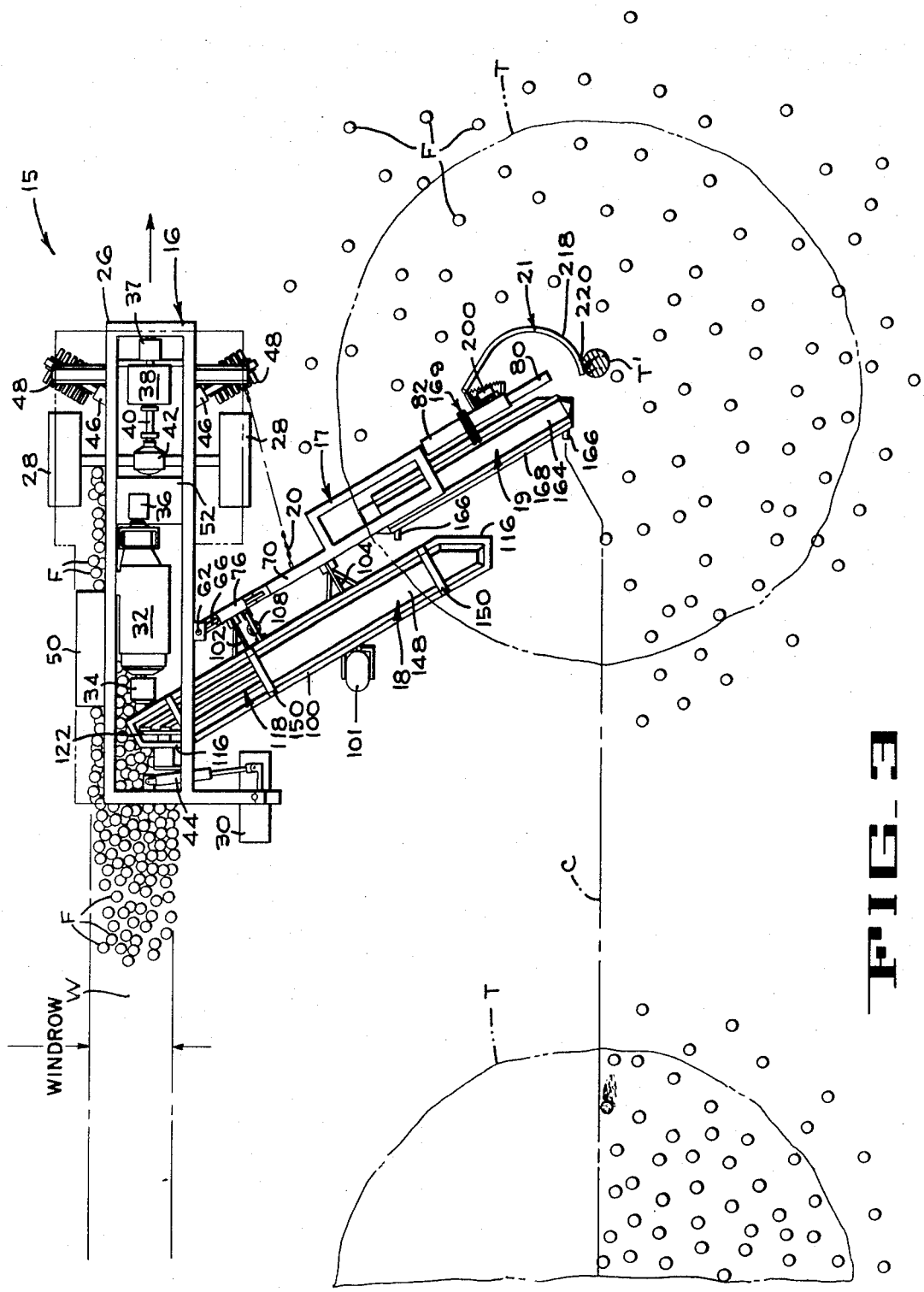

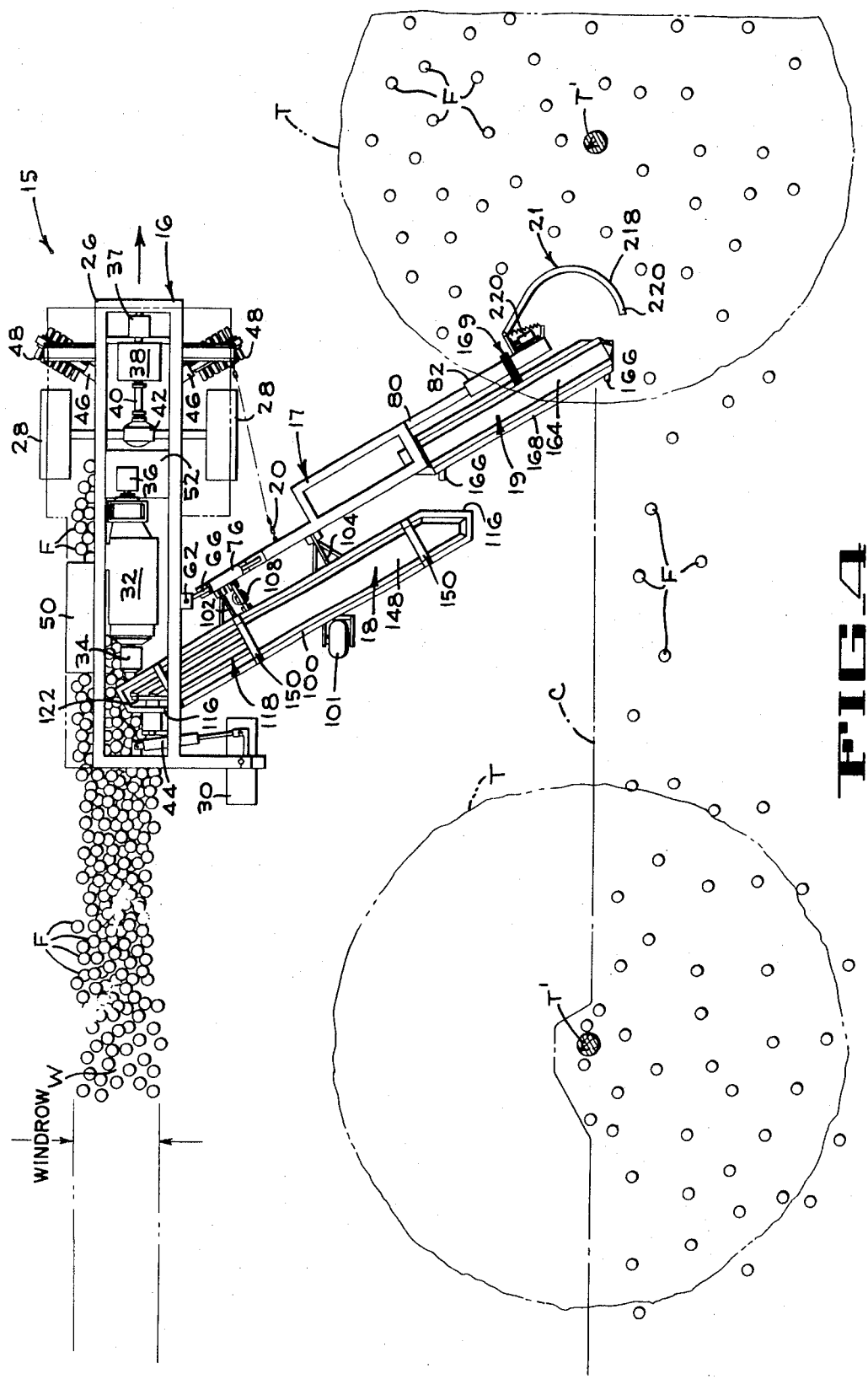

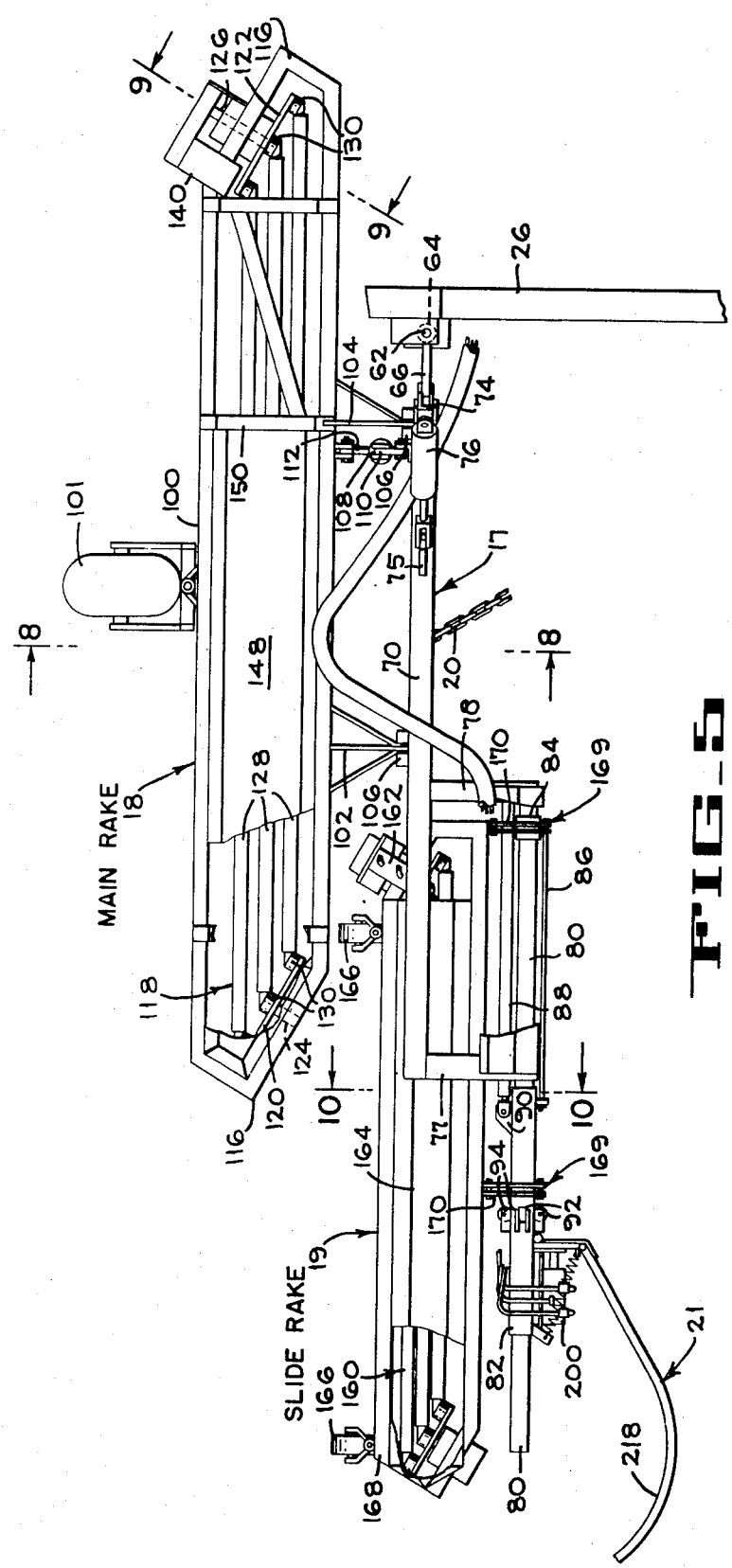

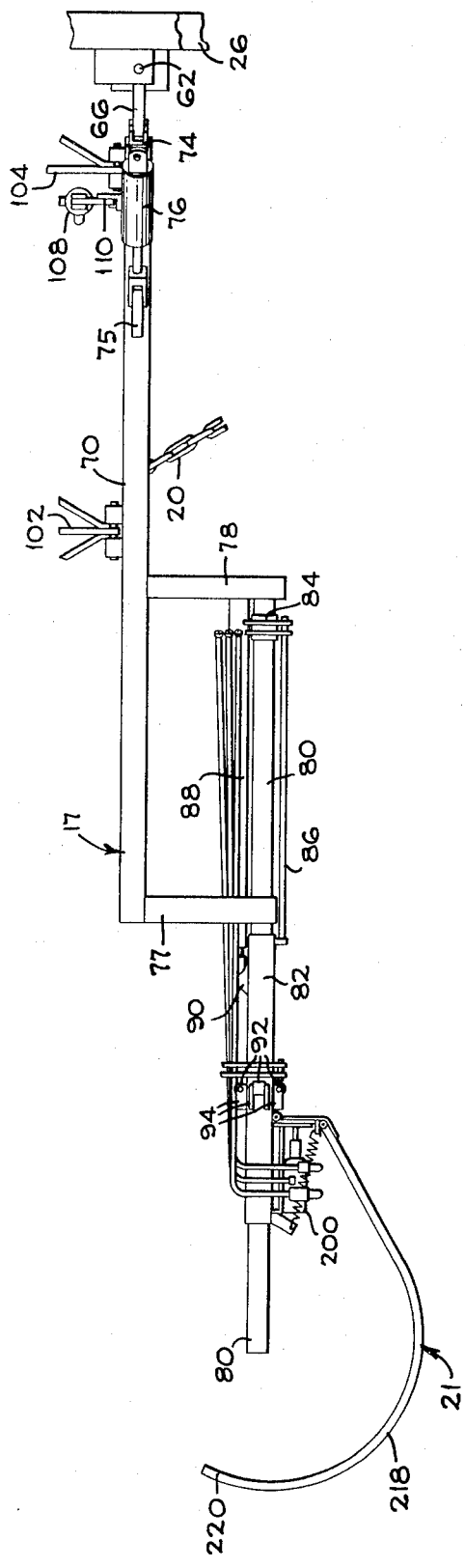

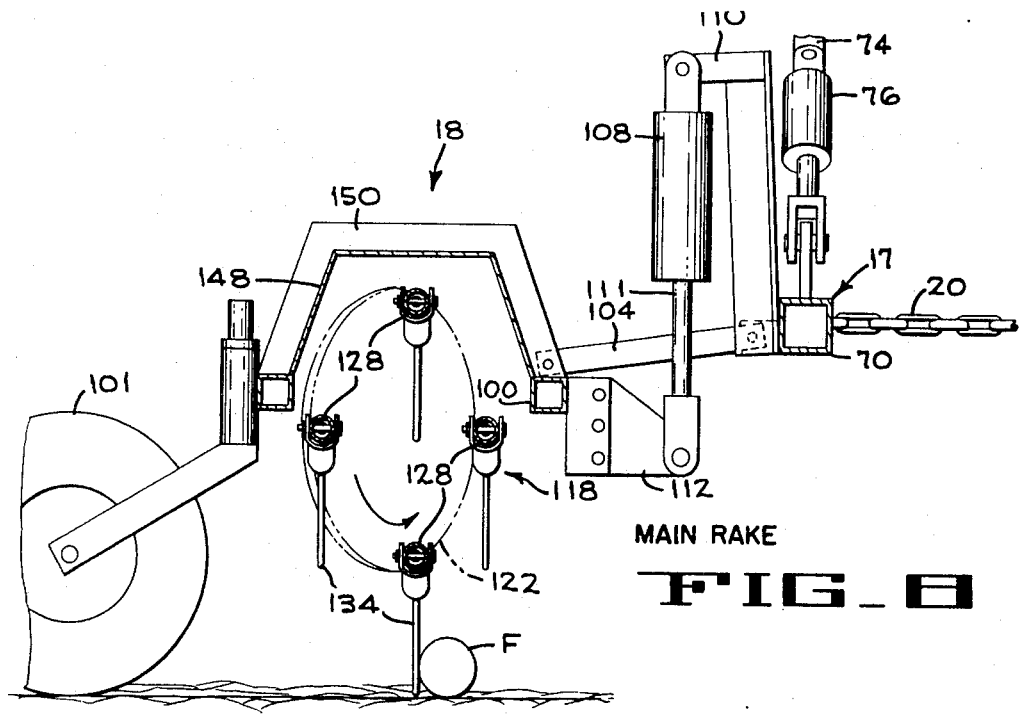
MAIN RAKE
FIG_8
FIG_9
MAIN RAKE
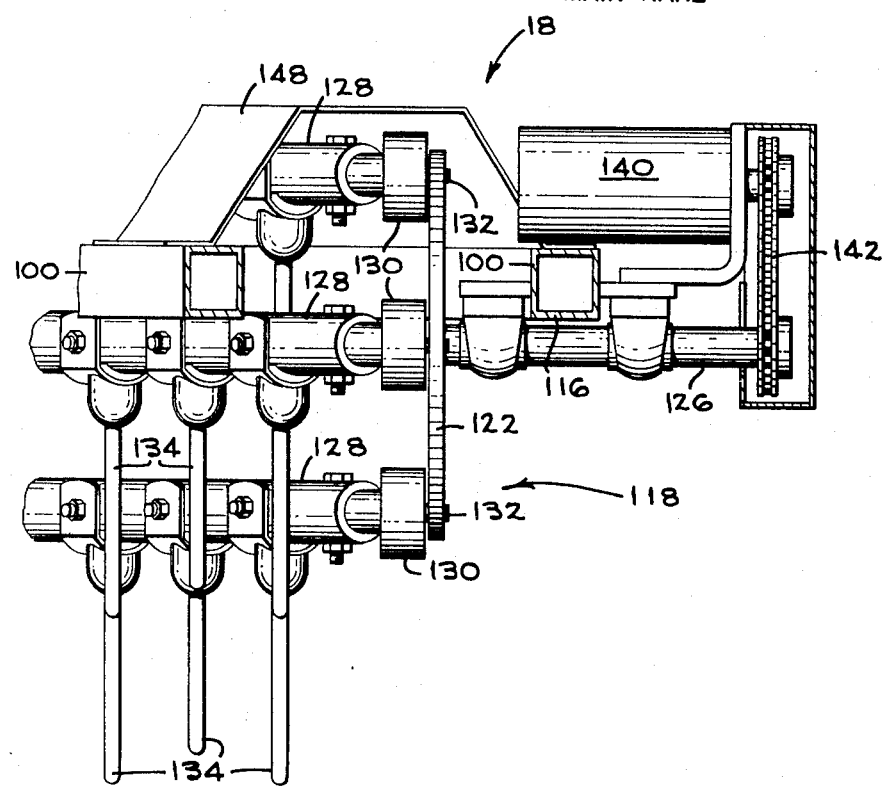

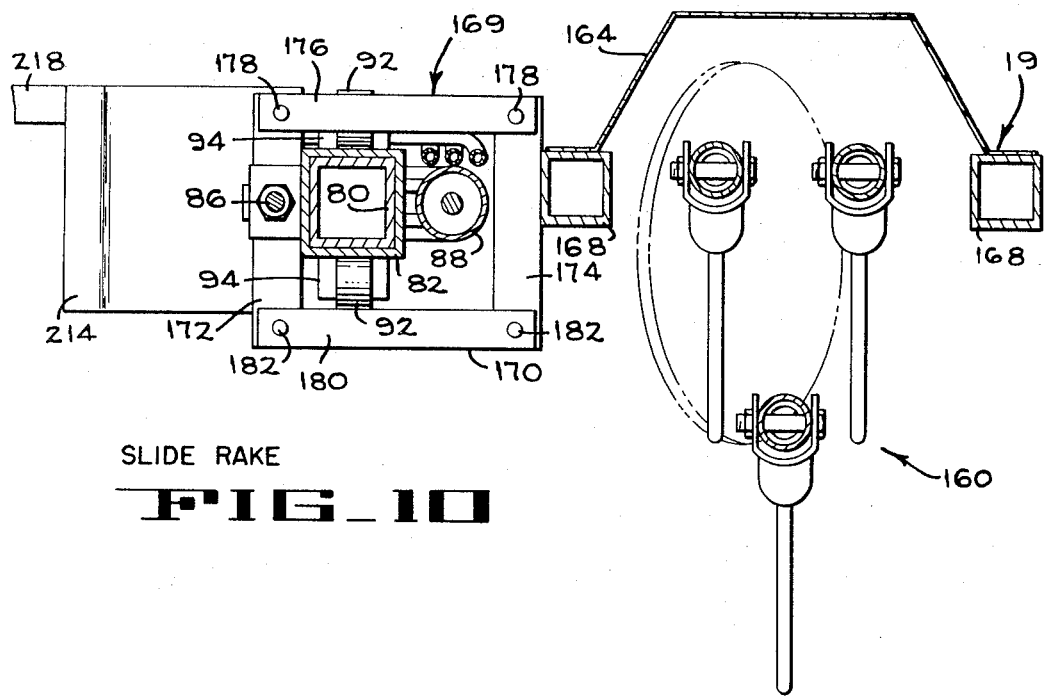
SLIDE RAKE
FIG_10
FIG_11
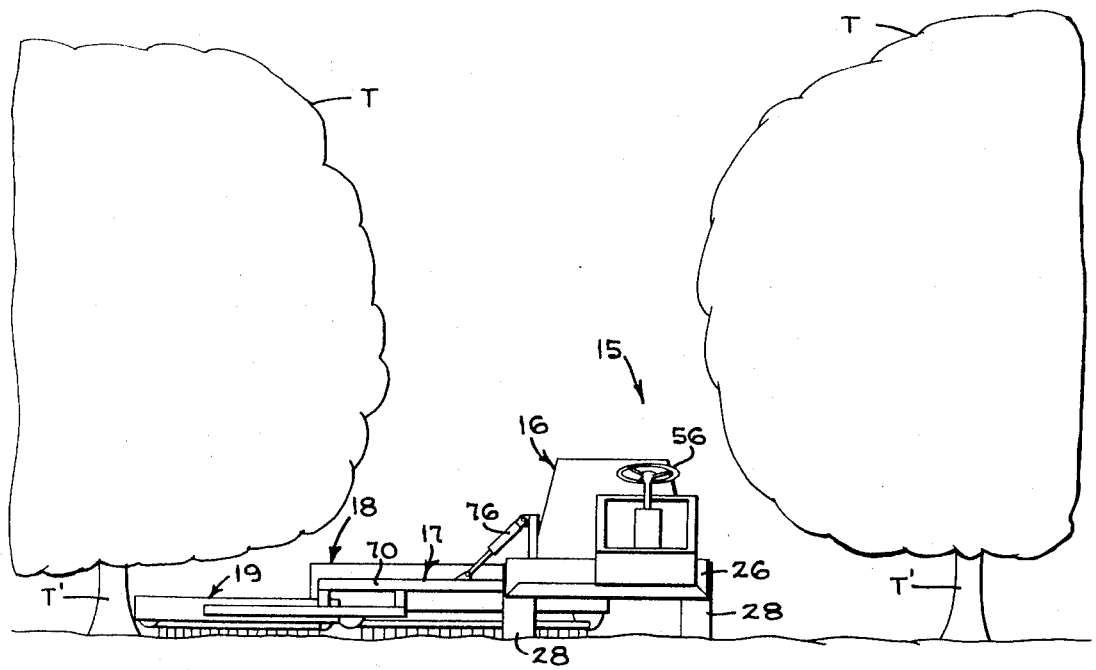

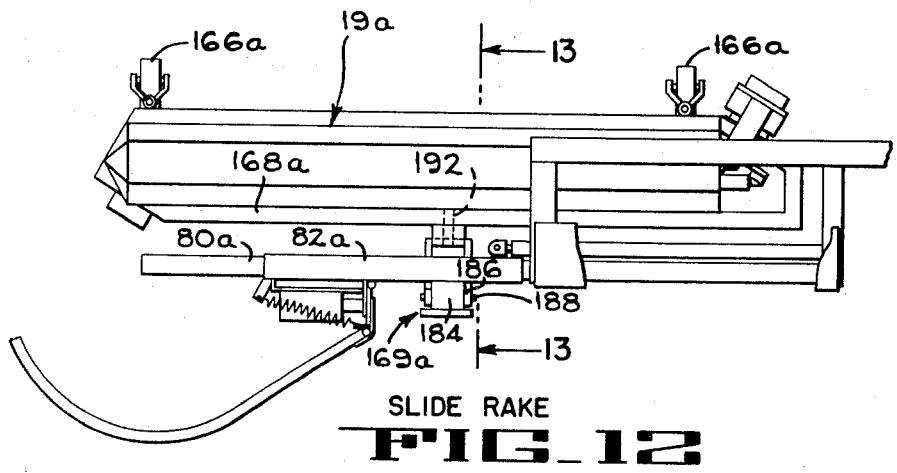
SLIDE RAKE
FIG_12
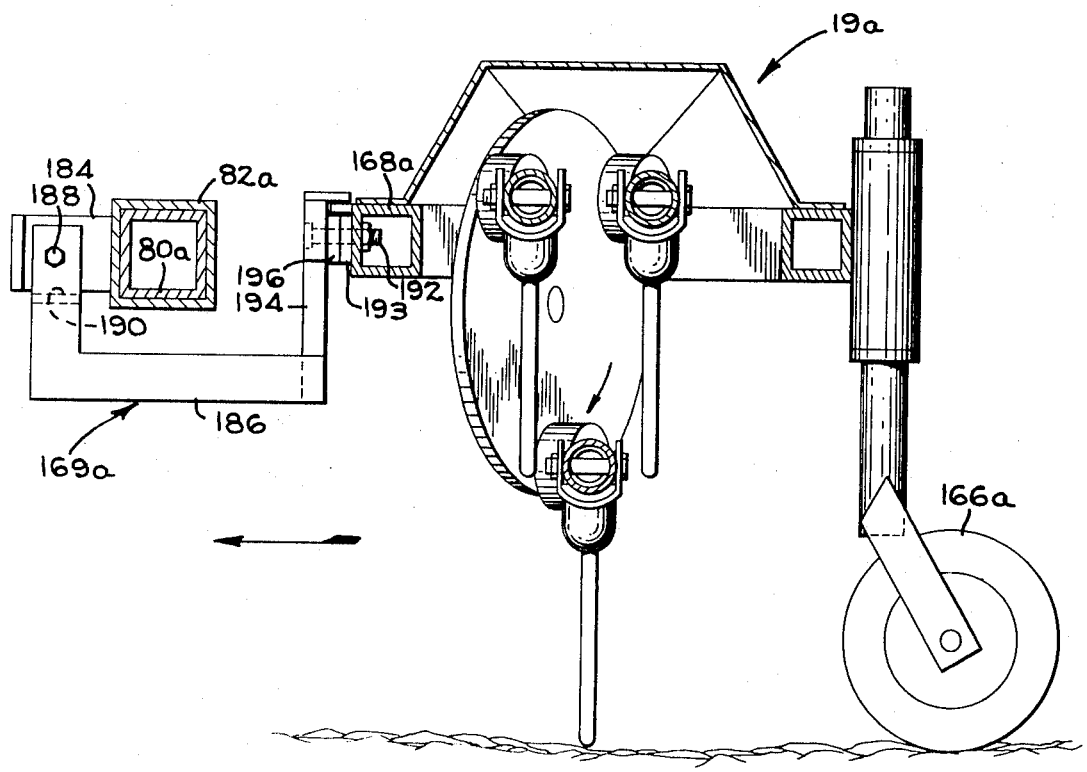
SLIDE RAKE
FIG_13

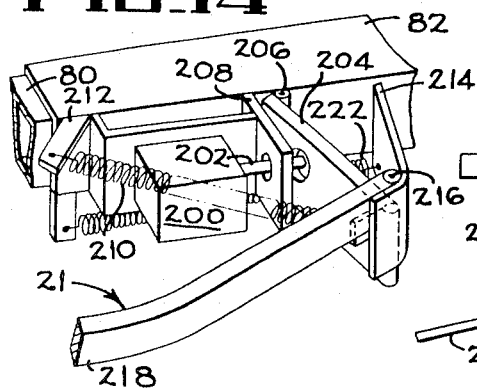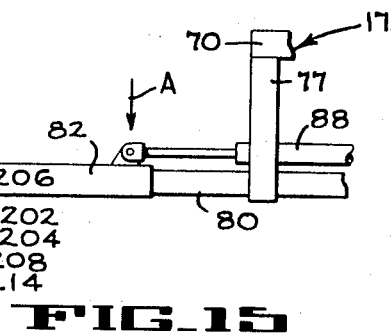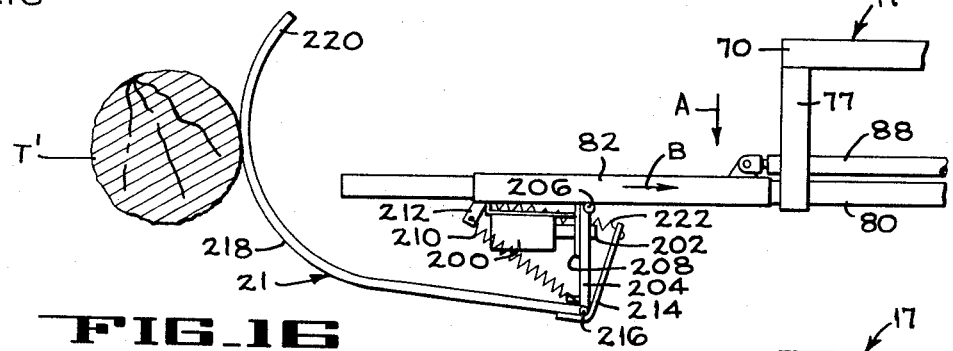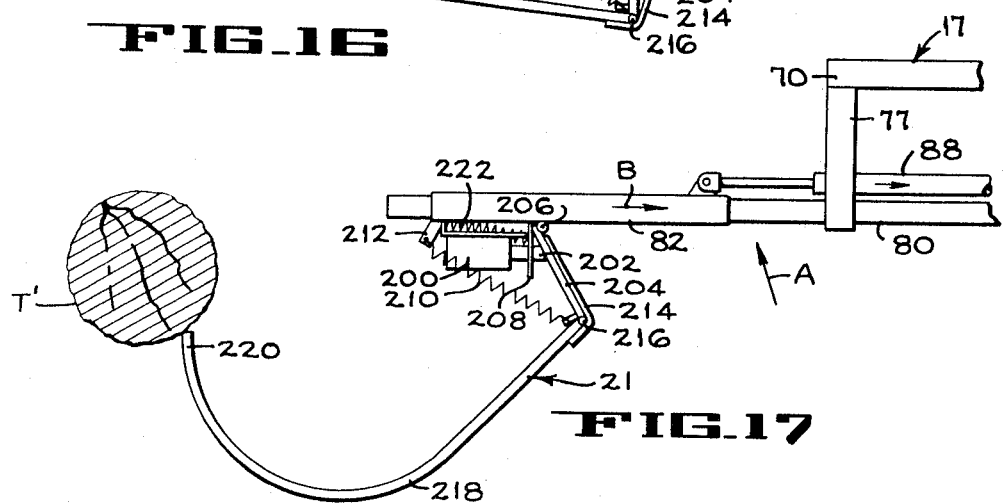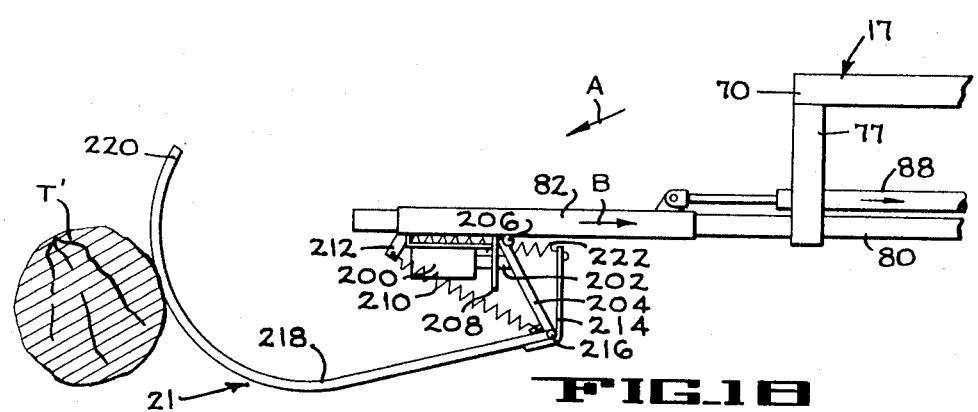

SIDE DELIVERY RAKE SUPPORT

CROSS-REFERENCE TO RELATED APPLICATION

The present application is a division of Donald P. Block application Ser. No. 248,221 filed Apr. 27, 1972, now U.S. Pat. No. 3,762,140.

BACKGROUND OF THE INVENTION

1. Field of the Invention

This invention pertains to the windrowing art, and more particularly relates to a support mechanism for accurately controlling the height of the tines of a side delivery rake above the uneven surface of the ground.

2. Description of the Prior Art

It is well known in the art to provide machines for moving crops such as hay or the like into windrows for ease in subsequent processing. This type of windrowing machine, including a windrower associated with a nut harvester as disclosed in U.S. Pat. No. 3,462,929 to Ingalls, usually have high silhouettes and would not be suitable for windrowing citrus fruit, nuts, prunes, or the like from the ground which is disposed directly under rows of trees having low hanging branches. Moreover, the prior art devices primarily compensate for ground undulations by providing resilient windrowing tines, as opposed to relying on the manner of mounting the windrowers to the vehicle, so as to accurately control the raking height of the tines relative to the ground as is required when windrowing fruit and nuts.

Furthermore, the problem of avoiding tree trunks and other obstructions when gathering the product from adjacent the tree row centerline was not solved by the prior art windrowers. It is recognized, however, that patents such as Smith et al. U.S. Pat. No. 2,882,978 and Coogan U.S. Pat. No. 3,006,420 disclose cultivators and controls therefor that are effective for retracting the cultivating tool out of the tree trunk centerline when the tool approaches an obstacle such as a tree trunk, stake, or the like.

SUMMARY OF THE INVENTION

The windrowing machine with which the side delivery rake support of the present invention is associated, is specifically designed for windrowing citrus fruit that has previously been shaken from trees planted in rows. Since citrus trees have very low hanging branches, and since the ground upon which the fruit falls is not completely flat but varies in elevation, the windrowing machine is designed to include a main rake and a slide rake which have very low silhouettes and which are mounted by the rake support in such a way as to minimize the effect of the undulations on the position of the rake tines relative to the ground. This is accomplished by providing a generally horizontal boom which is pivotally connected to and projects outwardly from one side of the vehicle chassis at a point substantially midway between the front and rear wheels on that side of the vehicle. The rakes are both pivoted to the boom and are each partially supported by at least one vertically adjustable caster wheel which cooperates with the boom pivot to minimize the effects of ground undulations on the relationship of the rake tines with the ground.

In order to rake the area between trees on the tree row centerline and yet provide a single non-wavy windrow, the slide rake is disposed forwardly of and overlaps the main rake. The main rake does not reciprocate, therefore assuring a straight windrow. The slide rake, however, is reciprocated into and out of the tree row centerline in response to a control mechanism or slide rake actuator when such mechanism moves into and out of contact with an abutment such as a tree trunk in the tree row centerline. The control mechanism operates when the vehicle is moving either forwardly or rearwardly. The single window is formed under the vehicle and partially covers the area on which the missing fourth wheel of a standard four wheel vehicle would normally ride.

It is therefore one object of the present invention to provide a rake mounting mechanism for a windrowing machine for windrowing articles such as fruit or nuts from uneven ground.

Another object is to provide a rake mounting mechanism for mounting rakes in a manner which will minimize the effect of ground undulations.

BRIEF DESCRIPTION OF THE DRAWINGS

FIG. 1 is a perspective of the windrowing machine of the present invention in an operative raking position, which windrowing machine incorporates the rake mounting mechanism of the present invention.

FIG. 2 is a perspective of the windrowing machine with the rakes at a transport position.

FIG. 3 is a diagrammatic plan of the apparatus in operative position but with the slide rake in its retracted position.

FIG. 4 is an enlarged plan showing the slide rake in its extended position.

FIG. 5 is an enlarged plan of the main and slide rakes, certain parts being cut away.

FIG. 6 is a plan of the rake supporting boom.

FIG. 7 is a side elevation of the rake supporting boom.

FIG. 8 is a vertical section taken along lines 8—8 of FIG. 5 illustrating the power unit for lifting the main rake.

FIG. 9 is a vertical section taken along lines 9—9 of FIG. 5 illustrating a hydraulic motor for driving the main rake.

FIG. 10 is a vertical section taken along lines 10—10 of FIG. 5 illustrating the preferred structure for pivotally mounting the slide rake to the boom.

FIG. 11 is an operational view illustrating the profile of the windrower relative to a tree with low hanging branches.

FIG. 12 is a plan of a slide rake with a modified form of mechanism for mounting the rake to the boom.

FIG. 13 is a section taken along lines 13—13 of FIG. 12.

FIG. 14 is a perspective of the slide rake actuator.

FIG. 15 is an operational view illustrating the slide rake actuator in a neutral position.

FIG. 16 is a view similar to FIG. 15 but showing the actuator being engaged when moving in the forward direction.

FIG. 17 is a view similar to FIG. 15 but showing the actuator being contacted when moving in a rearward direction.

FIG. 18 is a view similar to FIG. 15 but showing the actuator being contacted when the vehicle is moving in a direction angled relative to the normal direction of movement of the vehicle.

DESCRIPTION OF THE PREFERRED EMBODIMENT

The windrowing machine 15 (FIGS. 1, 2 and 3), within which is incorporated the mounting mechanism of the present invention, is specifically designed to windrow citrus fruit F previously shaken upon the ground from rows of trees T having trunks T' planted along a row centerline C. The machine 15 is designed to rake the fruit from between the trees T along the tree row centerline as well as from the area under the half row being raked, and to deposit all of this raked fruit into a single non-wavy windrow W.

Although the windrowing machine 15 will be described in the specification as handling citrus fruit, it will be understood that the machine may also handle other types of articles such as deciduous fruit and nuts, and even non-agricultural articles.

In general, the windrowing machine 15 (FIGS. 1-4) comprises a three-wheeled vehicle 16 having a generally horizontal boom assembly 17 pivotally connected thereto and projecting outwardly from one side thereof. A main non-reciprocating rake 18 and a reciprocable slide rake 19 are partially supported by the boom assembly 17 and are maintained in operative raking position angled outwardly and forwardly relative to the longitudinal axis of the vehicle by a connector such as a chain 20. The length of the chain may be varied to adjust the angle of the rakes relative to the longitudinal axis of the vehicle 16 so that a portion of the slide rake 19 will normally extend beyond the centerline of the tree row being raked when the vehicle is being driven midway between two tree rows. A control mechanism herein termed a slide rake actuating mechanism 21 is carried by the slide rake 19 and causes the slide rake to reciprocate out of the tree row centerline when the activator contacts an abutment such as a tree trunk T', and thereafter return to its extended position when past the obstruction. When being moved from grove to grove, for example, the rakes may be locked in a transport position with their longitudinal axes lying in a vertical plane parallel to the longitudinal axis of the vehicle 16.

More particularly, the windrowing machine 15 (FIGS. 1, 2 and 3) comprises a mobile self-powered vehicle 16 having a chassis 26 supported by driven front wheels 28 and a single steerable rear wheel 30 mounted behind and substantially in alignment with the right front wheel. The vehicle 16 is powered by an engine 32 which drives a hydraulic transmission pump 34 and a hydraulic processor pump 36. The transmission pump drives a transmission motor 37 which, in turn, drives the front wheels 28 through a four-speed gear transmission 38, a drive shaft 40 and a differential 42. The hydraulic processor pump 36 is connected to a plurality of hydraulic power units including a power cylinder 44 operatively connected to the steerable wheel 30 for steering the same, and hydraulic motors 46 operably connected to rotary brushes 48 which rake articles inwardly out of the path of movement of the front wheels 28. A skirt 49 (FIG. 2) prevents excessive rolling of the fruit delivered into the windrower W under the machine 26 by the main rake 18. The vehicle 16 carries a fuel tank 50 and a reservoir 52 for the oil of the hydraulic system.

An operators station including a seat 54 (FIGS. 1 and 2) steering wheel 56, and independent hydraulic controls 58 is mounted on the forward end of the vehicle to place the operator in position to easily see the area being raked.

The boom assembly 17 (FIGS. 5–7) is pivotally supported on the vehicle chassis 26 for pivotal movement about both the vertical and the horizontal axis. For this purpose, an upstanding bracket 60 (FIG. 7) is rigidly secured to the vehicle chassis 26 and has a vertical pivot shaft 62 rigid therewith. An upstanding tube 64 is journaled on the pivot shaft 62 and has an upper arm 66 and a lower arm 68 rigidly secured thereto. A boom frame 70 is pivoted to the lower arm 68 about a horizontal pivot pin 72 while the upper arm 66 pivotally supports a universal joint 74. A hydraulic boom cylinder 76 is pivotally connected between the universal joint 74 and a flange 75 welded to the boom frame 70.

The boom frame includes forwardly projecting arms 77 and 78 which support a slide rake support bar 80 of rectangular cross-section. An elongated slide rake mounting tube 82 and a short slide rake mounting tube 84, both of rectangular cross-section, are interconnected by a rod 86 and are slidably supported on the bar 80. A hydraulic slide rake cylinder 88 is pivotally connected between a flange 90 on the tube 82 and the boom frame arm 78, and causes both tubes 82 and 84 to reciprocate along the bar 80 in response to activation and deactivation of the slide rake actuating mechanism 21, which mechanism is mounted on the tube 82. In order to minimize frictional resistance during movement of the tubes 82 and 84 along the bar 80, four rollers 92 are journaled in yokes 94 welded to the tube 82 and extend through slots (not shown) in the tube 82 so as to roll along the bar 80. The slide rake 19 is movably connected to the tubes 82 and 84 by structure to be described hereinafter.

The main rake 18 (FIGS. 5, 8 and 9) is also partially supported on the boom assembly 17 and includes an elongated frame 100 having a caster wheel 101 pivotally connected to the trailing member of the frame 100 at approximately its longitudinal midpoint. The rake 18 is pivotally connected to the boom frame 70 by arms 102 and 104 (FIG. 5) that are rigidly secured to the main rake frame 100 and are pivoted to the boom frame 70 by bearing blocks 106. In order to lift the main rake off the ground, a main rake hydraulic cylinder 108 (FIG. 8) is pivotally connected between upstanding bracket 110 (FIG. 8) secured to the boom frame 70 and a yoke 112 connected to the main rake frame 100. The cylinder 108 is normally maintained in a neutral free floating condition to allow the slide rake to freely follow the ground contour. However, when making turns or the like, the cylinder 108 is activated to retract the piston rod 111 thereby pivoting the main rake upwardly about the pivot axis of the bearing blocks 106 to fully support the main rake on the boom assembly 17 as illustrated in FIG. 2.

The elongated frame 100 of the main rake 18 includes end wall segments 116 that are parallel and are disposed at a 30° angle relative to the longitudinal axis of the frame 100. The rake 18 includes a reel 118 which is preferably of the well known side delivery type as disclosed in the aforementioned Ingalls U.S. Pat. No. 3,462,929. The reel 118 includes a pair of spaced parallel discs 120 and 122 keyed to shafts 124 and 126 journaled on the end wall segments 116 of the rake frame 100. When the rake 18 is in its operative position as illustrated in FIGS. 3 and 4, it will be noted that the shafts 124 and 126 will lie in a plane substantially parallel to the direction of movement of the vehicle 16. The discs 120 and 122 support a plurality of rake bars 128 which extend between the discs and are journaled thereto by cranks 130 formed on the ends of the rake bars 128 for pivotal movement about the axes of pivot pins 132 (FIG. 9). A plurality of rake tines or fingers 134 are supported by and project downwardly from the rake bars. As indicated in FIG. 9, the fingers 134 are preferably not all the same length but alternate between short and long fingers. Depending upon the product being handled, the rake fingers 134 may be rigid or resilient. When handling citrus fruit, the fingers are preferably rigidly attached to the rake bars.

As illustrated in FIG. 9, the reel 118 is driven by a hydraulic motor 140 which is supported on the main rake frame 100 and is connected to the shaft 126 by a chain drive 142. The motor 140 drives the reel 118 so that the teeth move forwardly and toward the centerline of the windrow W when the fingers are contacting the fruit F. As is well known in the art, the fingers remain directed downwardly at all times during rotation of the reel by virtue of being anularly connected to the discs as above described. Since the rakes operate under low hanging branches, a housing 148 having reinforcing channels 150 disposed at intervals therealong is secured to the frame 100 to prevent such branches and foliage from contacting the reel 118.

The slide rake 19 (FIGS. 5 and 10) is substantially the same as the main rake 18 except for its size and capacity. As indicated in FIG. 11, the height of the slide rake 19 is approximately one-half that of the main rake 18. The slide rake includes a reel 160 driven by a hydraulic motor 162 and provided with a foliage deflecting housing 164. When in operation, the slide rake is partially supported by a pair of caster wheels 166 pivotally connected to opposite end portions at the rear of the frame 168 thus enabling the slide rake 19 to better follow the variations in ground contour and also more effectively controlling the reciprocal motion thereof.

As best shown in FIGS. 5 and 10, the slide rake is connected to the slide rake mounting tubes 82 and 84 by mounting mechanisms 169 each of which is in the form of a parallelogram linkage 170. Each parallelogram linkage 170 includes a plate 172 (FIG. 10) secured to the associated tube 82 or 84 and another plate 174 rigidly secured to the slide rake frame 168. Two upper bars 176 are loosely pivoted to the plates 172 and 174 by bolts 178. A similar pair of lower bars 180, which are parallel to the upper bars 176, are loosely pivoted to the lower portions of the plates 172 and 174 by bolts 182. As illustrated in FIG. 10, the slide rake mounting tubes 82 and 84 extend between the bars 176 and 180 thus allowing the forward end of the slide rake to raise or drop as the caster wheels 166 move over the varying ground contour. Also, the slide rake 19 may be lifted off the ground when desired upon actuation of the boom cylinder 76 (FIG. 5) since raising of the boom causes the upper bars 176 to contact their associated slide rake tubes 82 or 84 thus bodily lifting the slide rake, including the caster wheels 166, off the ground.

An alternate form of slide rake mounting mechanism 169a is illustrated in FIGS. 12 and 13. The mechanism 169a replaces the two parallelogram linkages 170 of the preferred embodiment by a single mechanism which is disposed substantially midway of the length of the slide rake 19a. The mechanism 169a comprises a block 184 rigidly connected to the slide rake mounting tube 82a. A U-shaped bracket 186 includes a yoke on one end which is pivoted to the block 184 by a bolt 188 which extends parallel to the axis of the slide rake 19a. The yoke includes an abutment wall 190 which serves to limit the amount of downward movement of the rake relative to the boom assembly slide bar 80a thus providing means for lifting the slide rake 19a completely off the ground when the boom is raised. A shouldered cap screw 192 is disposed normal to the axis of the slide rake and is threaded into a block 193 welded to the transverse midpoint of the forward slide rake frame member 168a. This capscrew is pivotally received in an upstanding leg 194 of a U-shaped bracket 186 and in a block 196 welded to the leg 194. Thus, raising of one caster wheel relative to the other will cause the slide rake 19a to pivot about the capscrew 192. A stop plate 198 welded to the top of the leg 194 and projecting over the block 193 is provided for limiting the transverse pivotal movement of the slide rake when the rake is lifted off the ground.

A feature of the invention is the provision of the control mechanism or slide rake actuating mechanism 21 (FIGS. 14–18) which will operate to retract the slide rake 19 upon contact with an abutment such as a tree trunk T' when moving in a plurality of different directions indicated by the arrows A and B. The slide rake actuating mechanism 21 is mounted on the slide rake support tube 82 and is provided for actuating a switching mechanism in the form of a four-way hydraulic valve 200. The hydraulic valve 200 is connected to the slide rake cylinder 88 and the hydraulic pump 34 (FIG. 3) by conventional conduits (not completely shown). The valve 200 includes a spring loaded core and valve stem 202 which when moved to its left directs fluid into the cylinder 88 causing the cylinder to move the slide rake and slide rake supporting tube 82 to its extended position. When the valve stem 202 is released and moved to its right rake retracting position (FIGS. 14–18), the valve causes the cylinder 88 to move the slide rake to its retracted position.

The slide rake actuating mechanism 21 includes an arm 204 pivoted at 206 to the tube 82 and normally urged against an abutment 208 by a spring 210. The spring 210 is connected between the free end of the arm 204 and an ear 212 rigid with the tube 82 to normally maintain the arm 204 spaced from and extending perpendicular to the valve stem 202 as illustrated in FIGS. 15 and 16. A valve actuating lever 214 is pivoted to the free end of the arm at 216 and has an elongated abutment sensing arm 218 with a curved outer end 220 rigidly secured thereto. A spring 222 is connected between the free end of the lever 214 and the tube 82 for normally holding the lever 214 in a position parallel to and against the arm as indicated in FIG. 15.

When the vehicle is windrowing while moving in the direction of arrow A and when the abutment sensing arm 218 and a portion of the slide rake 19 are projecting beyond the centerline of the tree trunks T' as indicated in FIG. 4, the slide rake actuating mechanism is in its neutral position shown in FIG. 15. Continued movement of the vehicle in the direction of arrow A causes the sensing arm 218 to contact a tree trunk T' thereby moving the switch actuating lever 214 about pivot point 216 away from the valve stem 202 thereby causing the slide rake tube 82 and slide rake 19 to move in the direction of arrow B to its retracted position as shown in FIGS. 3 and 16. If it becomes necessary to reverse the direction of movement of the vehicle as indicated by arrow A in FIG. 17, then both the arm 204 and the lever 214 pivot as a unit about axis 206 to shift the valve 202 and retract the slide rake as indicated by the arrow B in FIG. 17. Similarly, if the vehicle is moved at an angle as indicated by the arrow A in FIG. 18, the arm pivots about pivot point 206 and the lever 214 pivots about pivot point 216 thereby again shifting the valve 202 causing the slide rake to retract as indicated by arrow B.

Although the operation of the windrowing machine 15 has been covered above with the description of the several components of the machine, a brief summary of the operation will follow.

The trees T (FIGS. 3 and 4) in a citrus grove to be harvested are first shaken to cause the fruit to fall to the ground. The windrow machine is then driven to the grove with the rakes locked in the transport position illustrated in FIG. 2 wherein the total width of the machine 15 is less than 8 feet. The operator then manually moves the rakes 18 and 19 to the harvesting position illustrated in FIGS. 1, 3 and 4, and adjust the chain 20 so that the slide rake 19 when in its extended position will overlap the centerline C of the tree row being windrowed when the longitudinal axis of the vehicle 16 is midway between the row being windrowed and the next adjacent row. The operator then actuates the hydraulic controls to place the boom cylinder 76 and main rake cylinder 108 in neutral to permit free floating movement of the two rakes 18 and 19. The operator at this time actuates hydraulic controls which will drive the hydraulic motor 46, 140, and 162 thereby driving the rotary wheel brushes 48 and the reels 118 and 160 of the main rake 18 and the slide rake 19. The machine is then driven parallel to the half row being windrowed causing the fruit F disposed adjacent to and on both sides of the tree row centerline C to be raked inwardly by the slide rake 19 and discharged in front of the main rake 18. The main rake then moves this fruit and the remaining fruit in its path into a straight, non-wavy windrow W which is formed under the vehicle in the general location which would normally accommodate the missing wheel.

When the slide rake approaches a tree trunk T', the sensing arm 218 of the slide actuator 21 contacts the trunk and retracts the slide rake away from the trunk as indicated in FIG. 3. After passing the tree trunk T', the slide rake 19 again moves outwardly to rake the area adjacent and beyond the tree row centerline C. During this time, the caster wheels 101 and 166, and the pivotal mounting of the rakes to the boom assembly 17 follow the varying ground elevations or undulations thereby preventing the rake fingers from raising a distance above the ground sufficient to move over the fruit without windrowing the same.

From the foregoing description it is apparent that the rake mounting mechanism of the present invention provides means for accurately controlling the height of rake tines off the ground thereby causing the tines to more accurately follow varying undulations in the ground and thus more effectively windrowing the articles.

Although the best mode contemplated for carrying out the present invention has been herein shown and described, it will be apparent that modification and variation may be made without departing from what is regarded to be the subject matter of the invention.

What I claim is:

1. A windrowing machine for raking articles supported on an uneven surface into a windrow comprising: a mobile vehicle movable over said surface; means defining a rake support connected to said vehicle and extending transversely in a substantially horizontal position; an elongated rake disposed adjacent said rake support; wheel means connected to and partially supporting said rake; and mounting means connecting said rake to said rake support for vertical movement relative thereto in response to variations detected in the ground elevation by said wheel means for causing said rake to follow the undulations of said article supporting surface; said mounting means including means defining a parallelogram linkage having an upper link pivoted to said rake support and to said rake, and a lower link parallel to said upper link and pivoted to said rake support and to said rake.

2. A windrowing machine according to claim 1 wherein said rake support includes a rake boom extending through said parallelogram linkage means and normally positioned to permit limited pivotal movement of said upper and lower links, and additionally comprising means for raising said boom for first pivoting said links to one extreme of their movement and to then lift said rake and wheel means off said supporting surface.

3. A windrowing machine according to claim 1 wherein said mounting means includes a pair of said parallelogram linkage means connected to said elongated rake at widely spaced points.

4. A windrowing machine for raking articles supported on an uneven surface into a windrow comprising: a mobile vehicle movable over said surface; means defining a rake support connected to said vehicle and extending transversely in a substantially horizontal position; an elongated rake disposed adjacent said rake support; wheel means connected to and partially supporting said rake; and mounting means connecting said rake to said rake support for vertical movement relative thereto in response to variations detected in the ground elevation by said wheel means for causing said rake to follow the undulations of said article supporting surface; said vehicle including forward and rear wheels, said rake support being pivotally connected to said vehicle approximately midway between its front and rear wheels for minimizing the influence upon said rake of ground undulations longitudinally of the vehicle, said rake support being pivoted to said vehicle for movement about a vertical axis between a windrowing position projecting outwardly from one side of said vehicle to a transport position substantially parallel with the direction of movement of the vehicle.

5. An apparatus according to claim 2 wherein said vehicle includes forward and rear wheels, and wherein said rake support is pivotally connected to said vehicle approximately midway between its front and rear wheels for minimizing the influence upon said rake of ground undulations longitudinally of the vehicle.

6. An apparatus according to claim 5 wherein said rake support means is pivoted to said vehicle about a horizontal and a vertical axis, and wherein power means are provided for pivotally raising said rake support means.

* * * * *